(12) United States Patent
Yoshida

(10) Patent No.: US 7,804,919 B2
(45) Date of Patent: Sep. 28, 2010

(54) RUN LENGTH LIMITING APPARATUS AND RUN LENGTH LIMITING METHOD

(75) Inventor: Kenji Yoshida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 680 days.

(21) Appl. No.: 11/812,799

(22) Filed: Jun. 21, 2007

(65) Prior Publication Data

US 2008/0123783 A1  May 29, 2008

(30) Foreign Application Priority Data

Jun. 23, 2006  (JP) ............................. 2006-173921

(51) Int. Cl.
*H04L 27/06* (2006.01)
(52) U.S. Cl. ..................... 375/342; 714/758; 341/59
(58) Field of Classification Search ................. 341/58, 341/59, 102; 375/295, 342; 386/124; 714/758
See application file for complete search history.

(56) References Cited

U.S. PATENT DOCUMENTS 4,531,153 A  7/1985 Watanabe
6,654,425 B1  11/2003 Kunisa et al.
7,034,719 B2  4/2006 Shim et al.
7,568,144 B1 *  7/2009 Feng et al. .................. 714/758

FOREIGN PATENT DOCUMENTS

JP  62-164279  7/1987
JP  5-44711  7/1993

* cited by examiner

*Primary Examiner*—David C Payne
*Assistant Examiner*—Leon-Viet Q Nguyen
(74) *Attorney, Agent, or Firm*—Pillsbury Winthrop Shaw Pittman, LLP

(57) ABSTRACT

According to one embodiment, a run length limiting apparatus comprises an input section configured to input, a digital data string including a predetermined number of symbols which have the same number of bits, a search section configured to search for a specific symbol having a pattern that does not match any of the symbols included in the input digital data string, a calculation section configured to perform an exclusive OR operation between the specific symbol searched for and each of the symbols included in the input digital data string, and an output section configured to output the calculated digital data string together with the specific symbol.

6 Claims, 8 Drawing Sheets

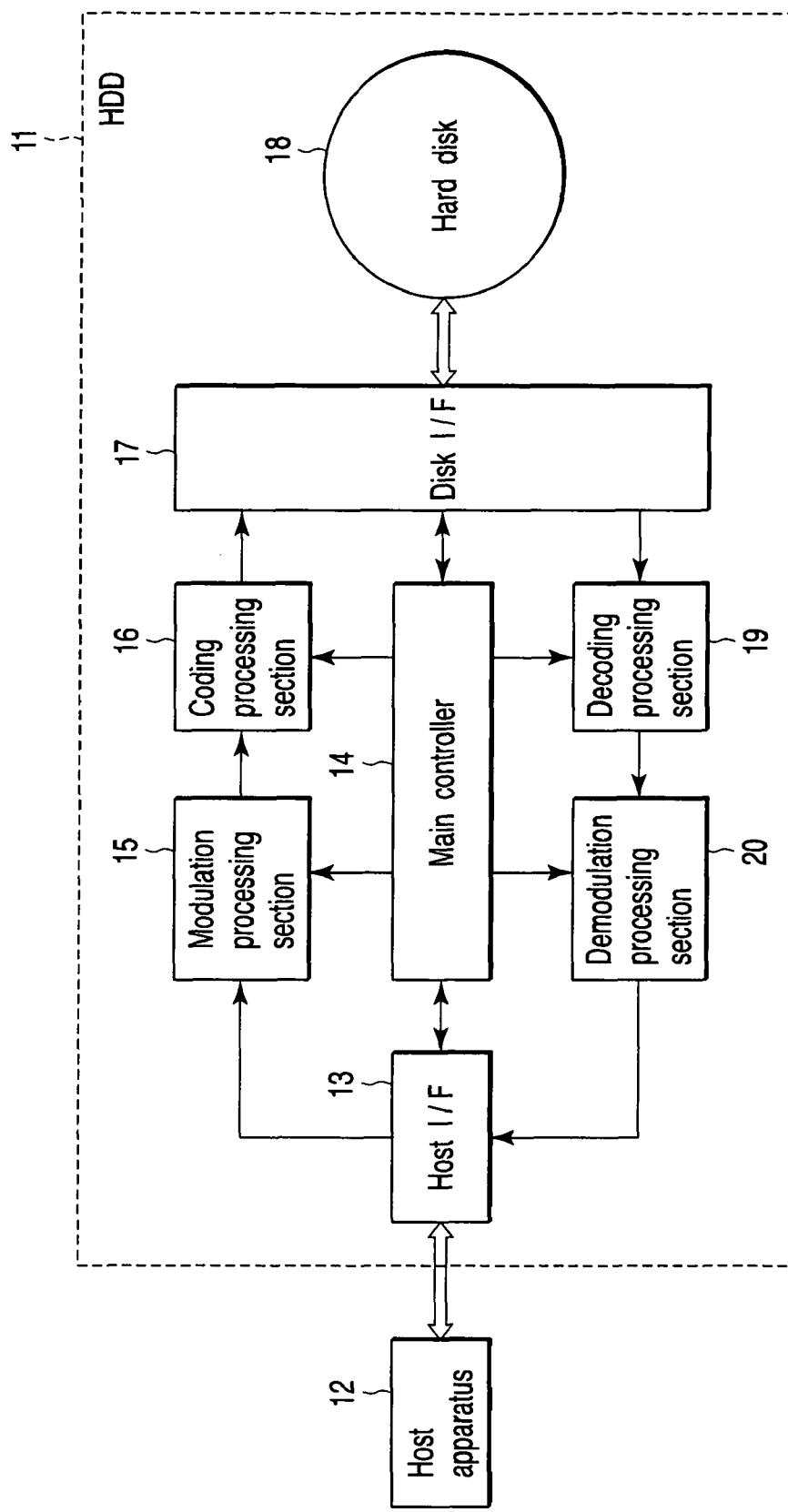
F I G. 1

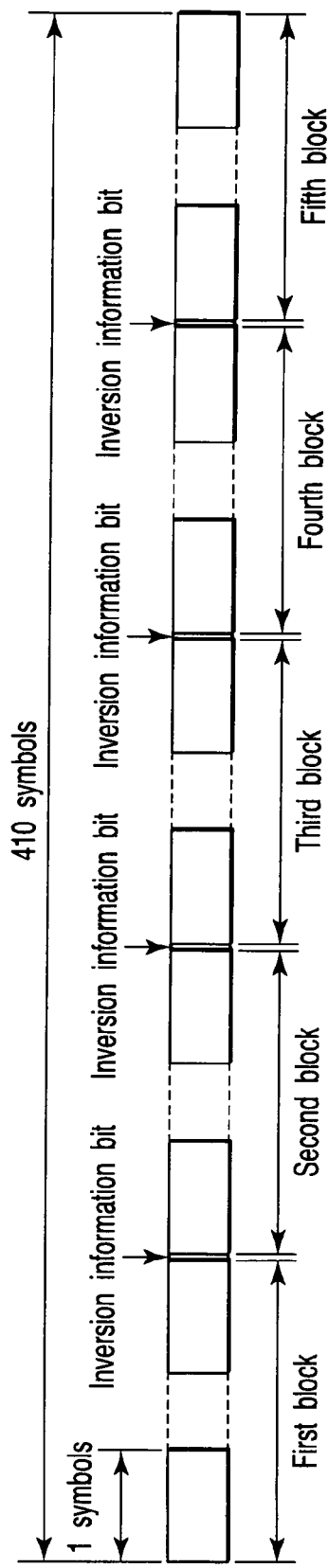
F I G. 5

RUN LENGTH LIMITING APPARATUS AND RUN LENGTH LIMITING METHOD

CROSS-REFERENCE TO RELATED APPLICATIONS

This application is based upon and claims the benefit of priority from Japanese Patent Application No. 2006-173921, filed Jun. 23, 2006, the entire contents of which are incorporated herein by reference.

BACKGROUND

1. Field

One embodiment of the present invention relates to a run length limiting apparatus and a run length limiting method for applying run length limiting processing to a digital data string to be recorded in an information recording medium.

2. Description of the Related Art

As is well known, when a digital data string is recorded in an information recording medium such as a hard disk or optical disk, run length limiting processing is applied to the digital data string in order to prevent "0" from appearing in series in the digital data string to be recorded. Of current run length limiting processing means, one having a high coding rate involves a large calculation amount, resulting in an increase in circuit scale.

Jpn. Pat. Appln. Publication No. 62-164279 discloses a technique that inverts all "1s" in a block obtained by adding a sync pattern to a data word group composed of a plurality of data words to "0s" and vice versa and contains information indicating whether bit inversion has been performed or not to thereby prevent the number of bits to be recorded from being increased.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing an outline of an HDD (Hard Disk Drive) 11 according to an embodiment of the present invention;

FIG. 5 is a view for explaining a second example of the run length limiting processing performed by the modulation processing section of an HDD in the present embodiment;

DETAILED DESCRIPTION

Figure 2:
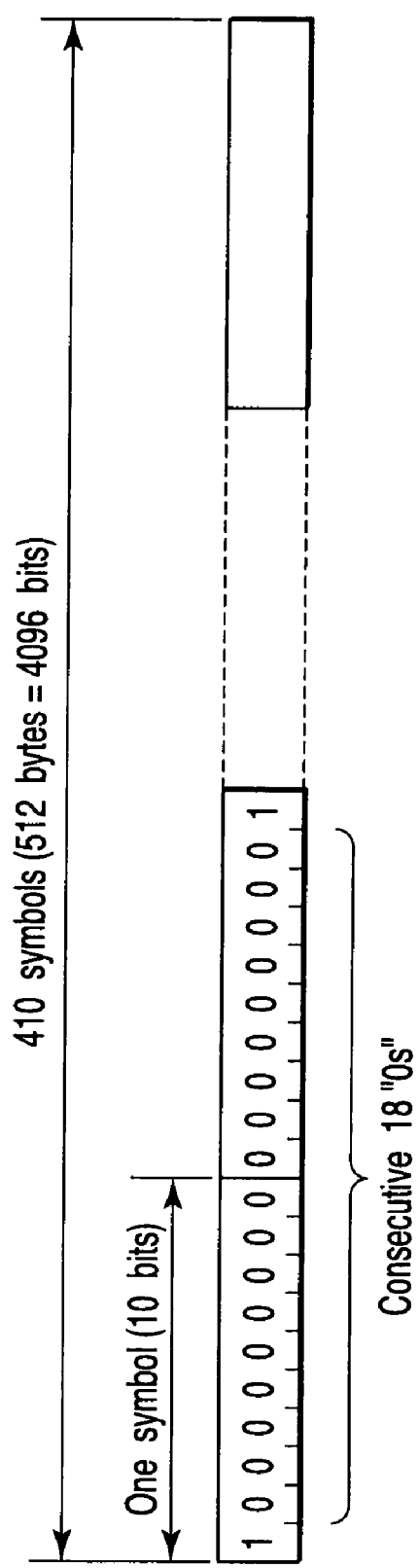
FIG. 2 is a view for explaining a first example of a run length limiting processing performed by a modulation processing section of an HDD in the present embodiment.

Various embodiments according to the invention will be described hereinafter with reference to the accompanying drawings. In general, according to one embodiment of the invention, a run length limiting apparatus comprises: an input section configured to input, a digital data string including a predetermined number of symbols which have the same number of bits; a search section configured to search for a specific symbol having a pattern that does not match any of the symbols included in the digital data string; a calculation section configured to perform an exclusive OR operation between the specific symbol searched for and each of the symbols included in the input digital data string; and an output section configured to output the calculated digital data string together with the specific symbol.

FIG. 1 shows an outline of an HDD (Hard Disk Drive) 11 which is an information recording/reproducing apparatus to be described in the present embodiment. The HDD 11 has a host I/F (interface) 13 for exchanging information with an external host apparatus 12.

The host apparatus 12 is, e.g., a PC (Personal Computer). When, for example, executing a predetermined software application, the host apparatus 12 utilizes the HDD 11 to perform writing/reading of information and to store information obtained as a result of the above processing.

At this time, the host apparatus 12 issues commands for requiring the HDD 11 to write and read out information. These commands are supplied to a main controller 14 through the host I/F 13 and there analyzed. The main controller 14 incorporates a CPU (Central Processing Unit) and controls various operations of the HDD 11.

For example, when a writing command is supplied from the host apparatus 12, the writing command is supplied to the main controller 14 through the host I/F 13 and there analyzed. Then, according to the writing command, the main controller 14 drives a modulation processing section 15 and coding processing section 16 and, at the same time, controls a disk I/F 17 to set the hard disk 18 in a writing state.

A digital data string to be written is supplied to the modulation processing section 15 through the host I/F 13. The modulation section 15 applies run length limiting processing (processing preventing the number of consecutive 0s from exceeding a certain run length), such as run length coding processing, that meets the requirement of a recording/reproduction system in the HDD 11 to the input digital data string.

The digital data string that has been subjected to the run length limiting processing by the modulation processing section 15 is supplied to the coding processing section 16. The coding processing section 16 calculates ECC (Error Correcting Code) parity, which is an error correcting code based on RS (Read Solomon code), and adds the calculated ECC parity to the input a digital data string.

The digital data string to which the ECC parity has been added by the coding processing section 16 is written in the hard disk 18 through the disk I/F 17, thereby achieving the writing processing of the digital data string in the hard disk 18, which is based on the writing request from the host apparatus 12.

When a reading command is supplied from the host apparatus 12, the reading command is supplied to the main controller 14 through the host I/F 13 and there analyzed. Then, according to the reading command, the main controller 14 drives a decoding processing section 19 and demodulation processing section 20 and, at the same time, controls the disk I/F 17 to set the hard disk 18 in a reading state.

A digital data string (including ECC parity) read out from the hard disk 18 is supplied to the decoding processing section 19 through the disk I/F 17. The decoding processing section 19 applies error correcting processing based on ECC parity to the input digital data string.

The digital data string that has been subjected to the error correcting processing by the decoding processing section 19 is supplied to the demodulation processing section 20. The demodulation processing section 20 demodulates run length limiting processing, such as run length coding processing that has been applied to the input digital data string to restore the original digital data string.

The digital data string to which the demodulation processing has been applied by the demodulation processing section 20 is output to the host apparatus 12 through the host I/F 13, thereby achieving the reading processing of the digital data string from the hard disk 18 which is based on the reading request from the host apparatus 12.

A first example of the run length limiting processing performed in the modulation processing section 15 will be described. Assume that user data of a 512 byte-digital data string is input to the modulation processing section 15. In this case, the digital data string is 4096 bits (1 byte=8 bits). Assuming that one symbol length takes 10 bits, the digital data contains 410 symbols, as shown in FIG. 2.

Since the number of patterns that a symbol containing 10 bits can form is $2^{10}=1024$, the modulation processing section 15 searches for a specific 10-bit symbol P having a pattern that does not match any of the input 410 symbols. Then, the modulation processing section 15 performs an exclusive OR operation between each of the input 410 symbols and symbol P searched for and outputs the 410 symbols together with the symbol P.

It follows that at least one "1" is necessarily contained in each of the 410 symbols.

The number of consecutive "0s" becomes maximum when, only the start bit of the first symbol of a given consecutive two symbols is "1" and only the end bit of the second symbol thereof is "1". In this case, the number of consecutive "0s" is 18. That is, in the first example, assuming that the number of bits contained in one symbol is n, the run length can be limited to 2n−2 at maximum.

As described above, searching of a specific symbol P having a pattern that does not match any of the input symbols and subsequent performance of an exclusive OR operation between each of the input symbols and symbol P easily achieve run length limiting processing with a simple structure to thereby limit the maximum number of consecutive "0s" to 18. Further, in this case, the number of output bits is 4106, which is obtained by adding the 10-bit symbol P to the input 4096 bits, and therefore the coding rate is as high as 0.99756 (=4096/4106). Thus, this method is suitable for practical use.

Figure 3:
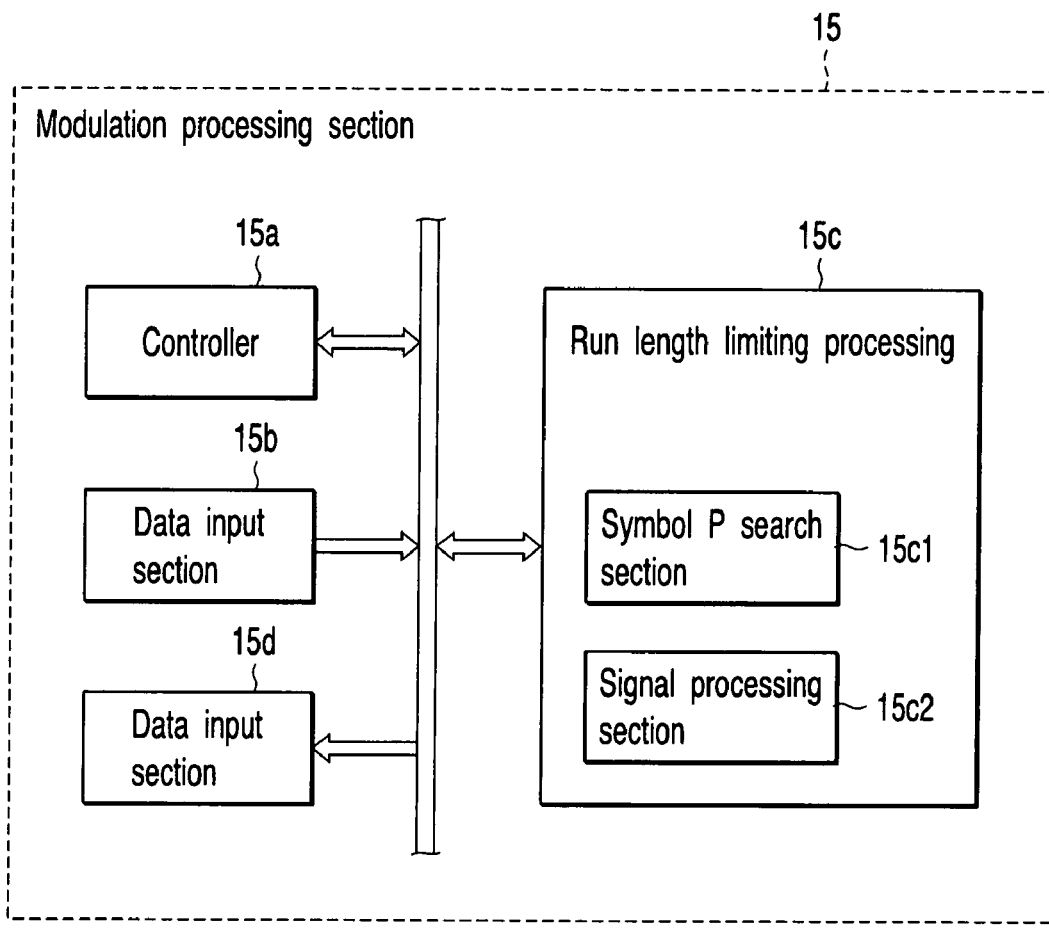
FIG. 3 is a block diagram showing an example of a configuration of the modulation processing section of an HDD in the present embodiment.

FIG. 3 shows an example of the modulation processing section 15. The modulation processing section 15 has a controller 15*a*, which is capable of exchanging data with the main controller 14, and controls various operations of the modulation processing section 15 under the control of the main controller 14.

The modulation processing section 15 further includes a data input section 15*b* for inputting digital data string which has been supplied from the host apparatus 12 for the purpose of being written in the hard disk 18, a run length limiting processing 15*c* for applying run length limiting processing for the input digital data string input to the data input section 15*b*, and a data output section 15*d* for outputting digital data string that has been subjected to the run length limiting processing in the run length limiting processing 15*c* to the coding processing section 16.

The run length limiting processing 15*c* includes a symbol P search section 15*c*1 for searching a specific symbol P and a signal processing section 15*c*2 for performing various calculations or determinations.

Figure 4:
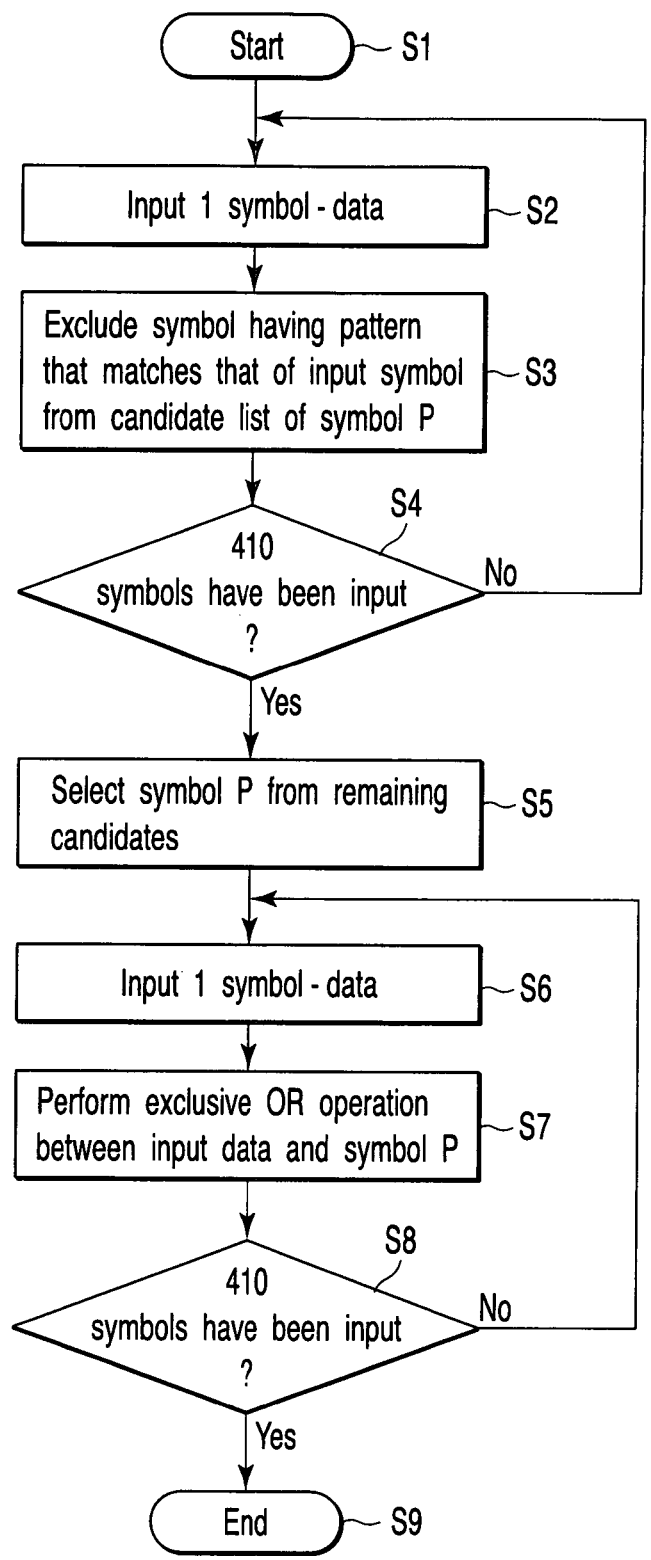
FIG. 4 is a flowchart for explaining a processing operation of a first example of the run length limiting processing in the present embodiment.

FIG. 4 shows a flowchart for explaining processing operation of the first example of run length limiting processing in the modulation processing section 15. The processing operation starts when 410-symbol digital data string to be written has been stored in the host I/F 13 (step S1).

Then, in step S2, the controller 15*a* allows the data input section 15*b* to input 1 symbol-(10 bit-) data from the host I/F 13 and allows, in step S3, the symbol P search section 15*c*1 to exclude a symbol having a pattern that matches that of the input symbol from a previously stored candidate list of symbols P including 1024 patterns that the 10-bit data can form. In the candidate list, at least [number of all data bits (4096)]/n (If the answer is aliquant, the fractional part is rounded up) symbols needs to be stored.

Subsequently, in step S4, the controller 15*a* determines whether all 410 symbols have been input or not. When determining that all the 410 symbols have not yet been input (NO), the controller 15*a* returns to step S2.

When determining, in step S4, that all the 410 symbols have already been input (YES), the controller 15*a* allows the symbol P search section 15*c*1 to select one symbol from the remaining candidates and to output the selected symbol as a symbol P in step S5.

After that, in step S6, the controller 15*a* allows the data input section 15*b* to input 1 symbol-data from the host I/F 13 once again and allows, in step S7, the signal processing section 15*c*2 to perform an exclusive OR operation between the input symbol and selected symbol P.

Subsequently, in step S8, the controller 15*a* determines whether all 410 symbols have already been input. When determining that all the 410 symbols have not yet been input (NO), the controller 15*a* returns to step S6.

When determining, in step S8, that all the 410 symbols have already been input (YES), the controller 15*a* allows the data output section 15*d* to output respective symbols that have been subjected to the exclusive OR operation together with the symbol P to the coding processing section 16 and ends this flow (step 9).

A second example of the run length limiting processing performed in the modulation processing section 15 will next be described. In the second example, the run length is limited to 2n−1 bits at maximum, and the frequencies of "0" and "1" are more balanced than in the case of the first example.

Assume that user data of a 512 byte-digital data string is input to the modulation processing section 15 as in the case of the first example. In this case, the digital data string is 4096 bits (1 byte=8 bits). Assuming that one symbol length takes 10 bits, the digital data contains 410 symbols, as shown in FIG. 5.

Since the number of patterns that a symbol containing 10 bits can form is $2^{10}=1024$, the modulation processing section 15 searches for a specific 10-bit symbol P having a pattern that does not match any of the input 410 symbols and any of inverted 410 input symbols.

As shown in FIG. 5, the modulation processing section 15 equally divides the 410 symbols into a plurality (in this case, five blocks) of blocks. In this case, one block contains 82 symbols. 1-bit inversion information bits are inserted respectively in four boundary portions between respective blocks.

The modulation processing section 15 compares a result obtained by performing an exclusive OR operation between each of 82 symbols and symbol P and the result obtained by performing an exclusive OR operation between each of inverted 82 symbols and symbol P with respect to second to fifth blocks, respectively, and outputs one in which the frequencies of "0" and "1" are more balanced than the other.

The modulation processing section 15 sets "0" as the inversion information bit inserted at the head of the block that outputs a result obtained by performing an exclusive OR operation between each of 82 symbols and symbol P, and sets "1" as the inversion information bit inserted at the head of the block that outputs a result obtained by performing an exclusive OR operation between each of the inverted 82 symbols and symbol P.

That is, in the second example, the modulation processing section 15 searches for a specific 10-bit symbol P having a pattern that does not match any of the input 410 symbols and any of the inverted 410 input symbols, compares with respect to each block a result obtained by performing an exclusive OR operation between each of the 82 symbols constituting each block and symbol P and the result obtained by performing an exclusive OR operation between each of the inverted 82 symbols constituting each block and symbol P, respectively, and outputs one in which the frequencies of "0" and "1" are more balanced than the other.

As a result, it is possible to easily achieve the run length limiting processing with a simple structure, in which frequencies of "0" and "1" are more balanced than in the case of the first example. Further, in this case, the number of output bits is 4110, which is obtained by adding the 10-bit symbol P and 4-bit inversion information bit to the input 4096 bits, therefore the coding rate is as high as 0.99659 (=4096/4110). Thus, this method is suitable for practical use.

In the second example, the number of consecutive "0s" becomes maximum when, only the start bit of the end symbol of the first block of a given consecutive two blocks is "1", only the end bit of the start symbol of the second block is "1", and the inversion information bit inserted between both the blocks is "0". In this case, the number of consecutive "0s" is 19. That is, assuming that the number of bits contained in one symbol is n, the run length can be limited to 2n−1 at maximum.

The reason for selecting, as the symbol P, a symbol having a pattern that does not match any of the input 410 symbols and any of the inverted 410 input symbols in the second example is to prevent all calculation results from being "0" when the exclusive OR operation is performed between each of the inverted symbols and symbol P. Further, in the above second example, the insertion number and insertion position of the inversion information bits may be arbitrarily determined.

Figure 6:
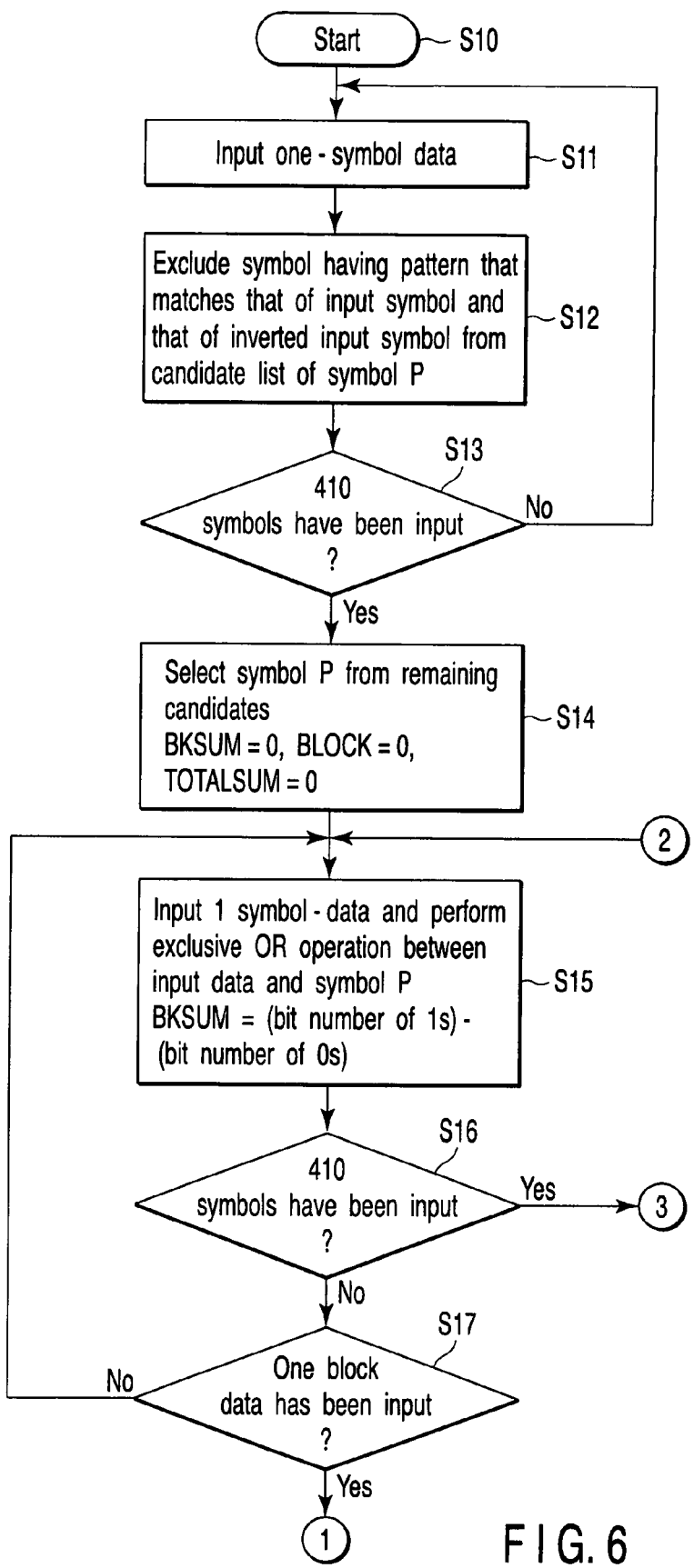
FIG. 6 is a flowchart for explaining a processing operation of a second example of the run length limiting processing in the present embodiment.
Figure 7:
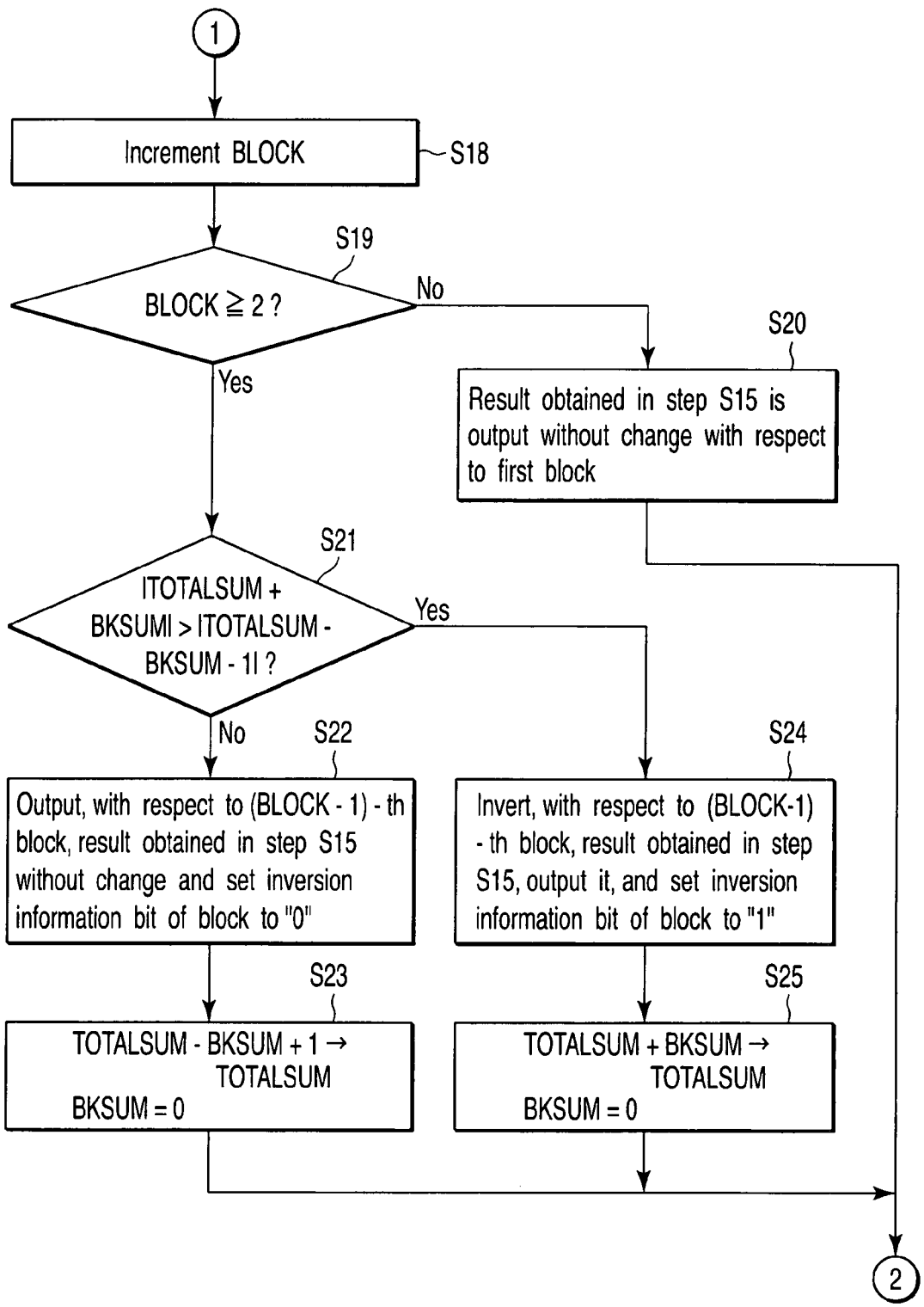
FIG. 7 is a flowchart for explaining the processing operation of the second example of the run length limiting processing in the present embodiment.
Figure 8:
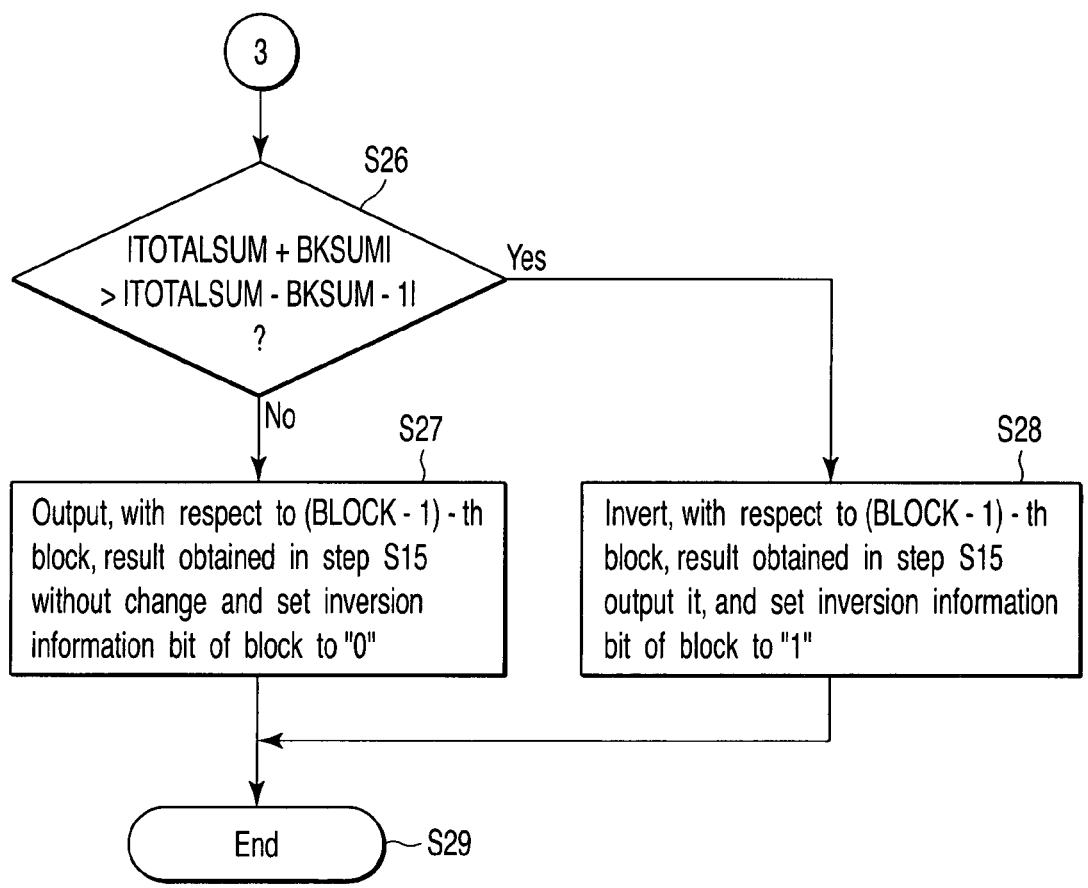
FIG. 8 is a flowchart for the explaining processing operation of the second example of the run length limiting processing in the present embodiment.

FIGS. 6 to 8 show flowcharts for explaining the second example of the run length limiting processing operation in the modulation processing section 15. The processing operation starts when a 410-symbol digital data string to be written has been stored in the host I/F 13 (step S10).

Then, in step S11, the controller 15a allows the data input section 15b to input 1 symbol-(10 bit-) data from the host I/F 13 and allows, in step S12, the symbol P search section 15c1 to exclude a symbol having a pattern that matches that of the input symbol and that of an inverted input symbol from a previously stored candidate list of symbol P including 1024 patterns that the 10-bit data can form.

Subsequently, in step S13, the controller 15a determines whether all 410 symbols have been input or not. When determining that all the 410 symbols have not yet been input (NO), the controller 15a returns to step S11.

When determining, in step S13, that all the 410 symbols have already been input (YES), the controller 15a allows the symbol P search section 15c1 to select one symbol from the remaining candidates and to output the selected symbol as a symbol P in step S14.

In step S14, the controller 15a initializes the difference BKSUM between the number of "1s" and number of "0s" in one block to 0, block number BLOCK to 0, and difference TOTALSUM between the number of "is" and number of "0s" in the 410 symbols to 0.

After that, in step S15, the controller 15a allows the data input section 15b to input 1 symbol-data from the host I/F 13 once again and allows the signal processing section 15c2 to perform an exclusive OR operation between the input symbol and selected symbol P and calculates BKSUM after the exclusive OR operation to add the obtained BKSUM to current BKSUM.

Subsequently, in step S16, the controller 15a determines whether all 410 symbols have already been input. When determining that all the 410 symbols have not yet been input (NO), the controller 15a determines whether symbol data corresponding to one block have already been input in step S17. When determining that symbol data corresponding to one block have not yet been input (NO), the controller 15a returns to step S15.

When determining, in step S17, that symbol data corresponding to one block have already been input (YES), the controller 15a increments the block number BLOCK in step S18 and determines whether the block number BLOCK is 2 or more in step S19.

When determining that the block number BLOCK is not 2 or more (in this case, block number BLOCK is 1, that is, the first block shown in FIG. 5) (NO), the controller 15a allows, in step S20, the data output section 15d to output the result obtained by performing the exclusive OR operation in step S15 without change and returns to step S15. As a result, with respect to the first block, the result obtained by performing an exclusive OR operation between each of the symbols in the first block and symbol P is output.

When determining, in step S19, that the block number BLOCK is 2 or more (that is, the second block and subsequent blocks shown in FIG. 5) (YES), the controller 15a determines whether the absolute value of (TOTALSUM+BKSUM) is larger than that of (TOTALSUM−BKSUM−1) in step S21. This indicates whether the number of "0s" is greater than the number of "1s" in the blocks from the first block to current block for which exclusive OR operation between each of the symbols and symbol P has been completed.

When determining that the number of "1s" is greater than the number of "0s" (NO), the controller 15a allows, in step S22, the data output section 15d to output, with respect to the (BLOCK−1)th block, the result obtained by performing an exclusive OR operation in step S15 without change and sets the inversion information bit inserted at the head of the block to "0".

After that, in step S23, the controller 15a subtracts the value obtained by adding 1 to BKSUM of the (BLOCK−1)th block from current TOTALSUM, initializes BKSUM to 0, and returns to step S15.

When determining, in step S21, that the number of "0s" is larger than the number of "1s" (YES), the controller 15a allows, in step S24, the data output section 15d to invert, with respect to the (BLOCK−1)th block, the result obtained by performing an exclusive OR operation in step S15 and output it (this output is the same as the result obtained by the aforementioned exclusive OR operation between each of the inverted symbols and symbol P). Further, the controller 15*a* sets the inversion information bit inserted at the head of the block to "1".

After that, in step S25, the controller 15*a* adds BKSUM of the (BLOCK−1)th block to the current TOTALSUM, initializes BKSUM to 0, and returns to step S15.

When determining, in step S16, that the 410 symbols have already been input (YES), the controller 15*a* determines whether the absolute value of (TOTALSUM+BKSUM) is larger than that of (TOTALSUM−BKSUM−1) in step S26. This indicates whether the number of "0s" is greater than the number of "1s" in the blocks from the first block to last block for which an exclusive OR operation between each of the symbols and symbol P has been completed.

When determining that the number of "1s" is larger than the number of "0s" (NO), the controller 15*a* allows, in step S27, the data output section 15*d* to output, with respect to the (BLOCK−1)th block (last block), the result obtained by performing an exclusive OR operation in step S15 without change, sets the inversion information bit inserted at the head of the block to "0", and ends this flow (step S29).

When determining, in step S26, that the number of "0s" is larger than the number of "1s" (YES), the controller 15*a* allows, in step S28, the data output section 15*d* to invert, with respect to the (BLOCK−1)th block (last block), the result obtained by performing an exclusive OR operation in step S15 and output it (this output is the same as the result obtained by performing the aforementioned exclusive OR operation between each of the inverted symbols and symbol P). Further, the controller 15*a* sets the inversion information bit inserted at the head of the block to "1" and ends this flow (step S29).

In the processing operation of the second example shown in FIGS. 6 to 8, the exclusive OR operation between each of n-bit symbols and symbol P in step S15 may be modified such that the exclusive OR operation is performed only for n−1 bits excluding a previously set specific one bit (e.g., start bit). This reduces the number of bits to be contained in the symbol P to n−1 bits, which means a reduction of output bits by one bit.

Further, patterns not suitable for recording, such as a pattern in which all bits are "0" or "1" may be previously excluded from the candidate list of the symbol P as long as one or more symbol P exist in the candidate list.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A run length limiting apparatus, comprising:
an input section configured to input, a digital data string including a predetermined number of symbols which have the same number of bits;
a search section configured to search for a specific symbol having a pattern that does not match any of the symbols included in the digital data string input to the input section;
a calculation section configured to perform an exclusive OR operation between the specific symbol searched for by the search section and each of the symbols included in the digital data input to the input section;
an output section configured to output the digital data string calculated by the calculation section together with the specific symbol searched for by the search section;
the search section previously has a list of sufficient number of candidates of the specific symbol, and
wherein, for the case where predetermined-position bits of each symbol included in the digital data string input to the input section matches a pattern that has previously been set, the search section excludes the matched pattern without change for the candidate list, while in the case were predetermined-position bits of each symbol included in the digital data string input to the input section does not match a pattern that has previously been set, the search section inverts all bits of the symbol and excludes matched patterns, if this pattern matches a pattern that has previously been set, from the candidate list so as to find a specific symbol that does not match any of symbols and any of inverted symbols after a predetermined number of symbols have been input.

2. A run length limiting apparatus, comprising:
an input section configured to input, a digital data string including a predetermined number of symbols which have the same number of bits;
a search section configured to search for a specific symbol having a pattern that does not match any of the symbols included in the digital data string input to the input section;
a calculation section configured to perform an exclusive OR operation between the specific symbol searched for by the search section and each of the symbols included in the digital data input to the input section;
an output section configured to output the digital data string calculated by the calculation section together with the specific symbol searched for by the search section;
wherein the search section is configured to search for a specific symbol having a pattern that does not match any of the symbols included in the digital data string input to the input section and any of the inverted symbols included in the digital data string input to the input section; and
wherein the output section is configured not to output a bit at a predetermined position at the time of outputting the specific symbol searched for by the search section.

3. A run length limiting apparatus, comprising:
an input section configured to input, a digital data string including a predetermined number of symbols which have the same number of bits;
a search section configured to search for a specific symbol having a pattern that does not match any of the symbols included in the digital data string input to the input section;
a calculation section configured to perform an exclusive OR operation between the specific symbol searched for by the search section and each of the symbols included in the digital data input to the input section;
an output section configured to output the digital data string calculated by the calculation section together with the specific symbol searched for by the search section;
wherein the search section is configured to search for a specific symbol having a pattern that does not match any of the symbols included in the digital data string input to the input section and any of the inverted symbols included in the digital data string input to the input section; and
wherein the output section divides the digital data string that has been subjected to calculation processing by the calculation section into a plurality of blocks each including a plurality of symbols and selectively outputs the digital data string that has been calculated by the calculation section and the digital data string obtained by inverting the digital data string that has been calculated by the calculation section such that the frequencies of "0" and "1" are balanced for each block.

4. A run length limiting apparatus according to claim 3, wherein the output section adds, to each block, inversion information bit indicating whether a digital data string calculated by the calculation section has been output and the digital data string obtained by inverting the digital data string calculated by the calculation section has been output.

5. A run length limiting method comprising:

a first step of inputting a digital data string including a predetermined number of symbols which have the same number of bits;

a second step of searching for a specific symbol having a pattern that does not match any of the symbols included in the digital data string input by the first step;

a third step of performing an exclusive OR operation between the specific symbol searched for by the second step and each of the symbols included in the digital data input by the first step; and a fourth step of outputting the digital data string calculated by the third step together with the specific symbol searched for by the second step;

the second step searches for a specific symbol having a pattern that does not match any of the symbols included in the digital data string input by the first step and any of the inverted symbols included in the digital data string input by the first step; and the fourth step divides the digital data string that has been subjected to calculation processing by the third step into a plurality of blocks each including a plurality of symbols and selectively outputs the digital data string that has been calculated by the third step and the digital data string obtained by inverting the digital data string that has been calculated by the third step such that the frequencies of "0" and "1" are balanced for each block.

6. A run length limiting method according to claim 5, wherein the fourth step adds, to each block, inversion information bit indicating whether the digital data string calculated by the third step has been output and the digital data string obtained by inverting the digital data string calculated by the third step has been output.

* * * * *